United States Patent
Olafsson

(12) 
(10) Patent No.: US 6,212,247 B1
(45) Date of Patent: Apr. 3, 2001

(54) METHOD AND APPARATUS FOR GENERATING A PROGRAMMABLE SYNCHRONIZATION SIGNAL FOR A DATA COMMUNICATION SYSTEM

(75) Inventor: Sverrir Olafsson, Reykjavik (IS)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 08/922,851

(22) Filed: Sep. 3, 1997

(51) Int. Cl.[7] .................................................. H04L 7/00
(52) U.S. Cl. .......................... 375/358; 375/221; 370/509
(58) Field of Search .................................. 375/358, 221, 375/222, 356, 368; 370/503, 507, 509, 514, 522, 510, 511, 512, 513, 515, 465, 468

(56) References Cited

U.S. PATENT DOCUMENTS

| | | | |
|---|---|---|---|
| 4,110,558 | * 8/1978 | Kageyama et al. | 375/357 |
| 4,411,007 | * 10/1983 | Rodman et al. | 375/356 |
| 4,445,175 | * 4/1984 | Cohen | 340/825.08 |
| 5,228,060 | * 7/1993 | Uchiyama | 375/316 |
| 5,394,437 | 2/1995 | Ayanoglu | 375/222 |
| 5,822,328 | * 10/1998 | Derby et al. | 370/507 |

FOREIGN PATENT DOCUMENTS

| | | |
|---|---|---|
| 0669740A2 | 8/1995 | (EP). |
| WO 96/18261 | 6/1996 | (WO). |
| WO 98/37657 | 8/1998 | (WO). |

* cited by examiner

*Primary Examiner*—Chi Pham
*Assistant Examiner*—Phuong Phu
(74) *Attorney, Agent, or Firm*—Snell & Wilmer, LLP

(57) ABSTRACT

A modem system includes a programmable synchronization signal format that can be configured at a first modem in response to a request received from a second modem. The synchronization signal format may define a number of parameters of the synchronization signal, such as the sign pattern for symbols transmitted by the first modem during a training sequence. The specific parameters of the synchronization signal format may be associated with the design and operation of the second modem. For example, the particular timing recovery and automatic gain control schemes used by the receiver portion of the second modem may be optimally initialized with a synchronization signal having a specific length, amplitude, or spectrum.

44 Claims, 3 Drawing Sheets

METHOD AND APPARATUS FOR GENERATING A PROGRAMMABLE SYNCHRONIZATION SIGNAL FOR A DATA COMMUNICATION SYSTEM

TECHNICAL FIELD OF THE INVENTION

The present invention relates generally to synchronization techniques used in data communication systems, e.g., modem systems, that transmit data between remote locations. More specifically, the present invention relates to the use of a programmable synchronization signal that facilitates improved compatibility between a transmitter and a receiver during a synchronization process performed by a data communication system.

BACKGROUND OF THE INVENTION

Digital communication systems, such as modem systems, are well known in the prior art. Such systems typically employ timing recovery techniques that are utilized to recover the symbol rate at which the data is transmitted. Such systems also use synchronization techniques that are utilized to align the receiver clock with the transmitter clock. Indeed, the prior art is replete with various timing recovery and synchronization techniques; several timing recovery schemes are discussed in Lee & Messerschmitt, DIGITAL COMMUNICATION, pp. 737–764 (2d ed. 1996), the contents of which are incorporated herein by reference.

Many modem systems transmit synchronization signals concurrently with the data transmitted from the transmit modem; the synchronization signals are detected by the receive modem and processed to synchronize the receive modem to the transmit modem. Often, the synchronization signals are transmitted near the beginning of a "handshaking" procedure, during a receiver training procedure, or periodically during data transmission (to resynchronize the receive modem with the transmit modem). In addition to the synchronization of timing recovery loops, such synchronization signals are often employed to initialize automatic gain control (AGC) circuits.

The specific synchronization technique and the particular synchronization signal used by a given communication system may depend on the design of the system itself. For example, a given synchronization signal may be configured to be easily detectable at the receiver and to effectively convey the timing phase of the transmitted signal. Thus, the precise format of the synchronization signal may vary according to the detection scheme utilized at the receiver and the characteristics of the transmission channel. Consequently, the synchronization techniques and synchronization signals used in prior art modem systems may be predetermined in accordance with internationally recognized operating standards and protocols. Indeed, such techniques may be effective when utilized in the context of standardized modem systems having wholly compatible hardware and software.

Unfortunately, such rigidly configured synchronization signals may not be desirable in the context of a pulse code modulation (PCM) modem system, such as a 56 kbps modem system, which may employ any one of a number of different timing recovery schemes. For example, a particular PCM modem system may use a timing recovery method that processes unequalized signals; such timing recovery methods typically require timing initialization prior to training of the receiver equalizers. Alternately, a PCM modem system may use a decision-based timing recovery method for which initial timing phase is unimportant for proper operation. Consequently, different timing recovery techniques may require different synchronization signals (e.g., a signal with rich spectral content including energy at the Nyquist frequency for the former method and a relatively simple, easy-to-detect signal for the latter method). In addition, different AGC schemes may require differently configured synchronization signals for acceptable performance. For example, it may be desirable to provide a synchronization signal having a wide spectrum to facilitate an accurate initialization of an AGC circuit during transmission of the synchronization signal. On the other hand, if accurate AGC initialization is not required during this time, then a simpler synchronization signal having less spectral content may be utilized.

Conventional modem systems typically operate with a 40 dB signal-to-noise ratio, which may be acceptable for transmission at relatively low speeds. In contrast, 56 kbps modem systems may require a signal-to-noise ratio of 60 dB or more. Accordingly, the AGC circuit in a 56 kbps system may require a more accurate initialization to properly fix the AGC parameters to reduce the noise contributed by the AGC circuit. In addition, an accurate timing recovery technique that utilizes an optimum synchronization signal may be desirable in order to achieve the stricter signal-to-noise requirement for 56 kbps systems.

Accordingly, the specific receiver design in a PCM modem system may dictate the particular configuration of the synchronization signal used by the system. Such synchronization signals may be short and simple tones or complex multi-tone signal patterns. However, a synchronization signal that is effective for one PCM receiver may be unsatisfactory for use with another PCM receiver; such compatibility problems may detract from the performance of these PCM systems. In addition, it may be difficult to detect or utilize prior art synchronization signals that are governed by current standards and protocols where such synchronization signals are not optimized for use with the specific receiver.

SUMMARY OF THE INVENTION

Accordingly, it is an advantage of the present invention that an improved synchronization technique is provided in the context of remote data communication systems.

Another advantage is that the present invention provides a data communication system that utilizes a programmable synchronization signal that is configured in accordance with the particular receiver design.

A further advantage is that a modem system is provided that includes a transmitter configured to generate a particular synchronization signal that may be associated with the timing recovery scheme utilized by the receiver.

Another advantage is that the present invention provides a receiver modem capable of requesting transmission of a specifically formatted synchronization signal that may be used to initialize a timing recovery process.

Another advantage is that the present invention employs a programmable synchronization signal that may be used to initialize an automatic gain control circuit used by a receiver modem.

The above and other advantages of the present invention may be carried out in one form by a method for use in a data communication system having a first device configured to transmit data at a symbol rate to a second device. The method involves the steps of: defining a synchronization signal descriptor associated with a receiver located at the second device; sending information indicative of the synchronization signal descriptor from the second device to the first device; receiving the information at the first device; and generating a synchronization signal for transmission from the first device to the receiver, wherein the synchronization signal is configured in accordance with the synchronization signal descriptor.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF PREFERRED EXEMPLARY EMBODIMENTS

Figure 1:
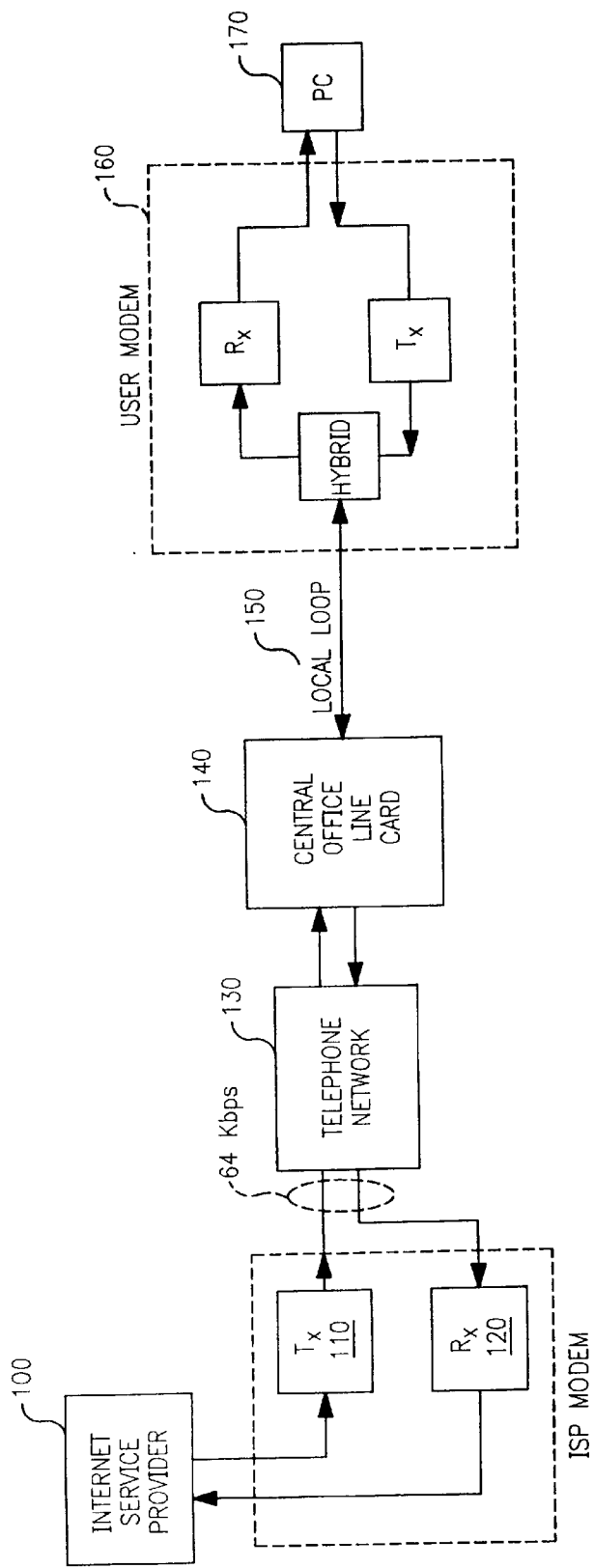
FIG. 1 is a block diagram of an exemplary 56 kbps pulse code modulation (PCM) modem environment.

FIG. 1 shows an exemplary 56 kbps pulse code modulation (PCM) based modem environment in which the present invention may operate. An internet service provider (ISP) or central site 100 is digitally connected to a telephone network 130 through its transmitter 110 and receiver 120. Telephone network 130 is connected to a local loop 150 through a central office line card 140. Line card 140 typically has a PCM codec (not shown) implemented therein. Local loop 150 is connected to a user's personal computer (PC) 170 at the user's site through the user's modem 160. As can be appreciated by those skilled in the art, the connection between the ISP modem transmitter 110 to telephone network 130 is a digital connection with a typical data rate of about 64 Kbps. Since the parameters of telephone network 130 and line card 140 are dictated and set by the telephone company's specifications and operation (and particularly their use of the $\mu$-law signal point constellation), transmitter 110 needs to transmit the digital data in a particular format to fully exploit its digital connection to telephone network 130. Those skilled in the art will appreciate that the system depicted in FIG. 1 may employ any number of known signal processing, coding, and decoding techniques related to, e.g., $\mu$-law signal point constellations, shell mapping, spectral control, equalizer training, and the like. For the sake of brevity, such known techniques and systems are not described in detail herein. It should also be noted that the principles of the present invention are not limited to modem applications and that the present invention may be suitably modified or configured for deployment in any number of data communication systems.

Generally, the typical PCM modem system formats digital data for transmission from transmitter 110 to user modem 160, where the digital data is retrieved for use by PC 170. The data may be arranged into data symbols and encoded via any number of techniques such as $\mu$-law mapping. The data symbols may then be further processed with spectral control or other signal conditioning schemes prior to being transmitted at a particular symbol rate to telephone network 130. User modem 160 eventually receives the data symbols and thereafter decodes the data to obtain the original digital data. To function efficiently, user modem 160 should be synchronized with the ISP modem. Consequently, user modem 160 may include a timing recovery scheme that recovers the transmitted symbol rate and synchronizes the receiver at user modem 160 with transmitter 110.

Figure 2:
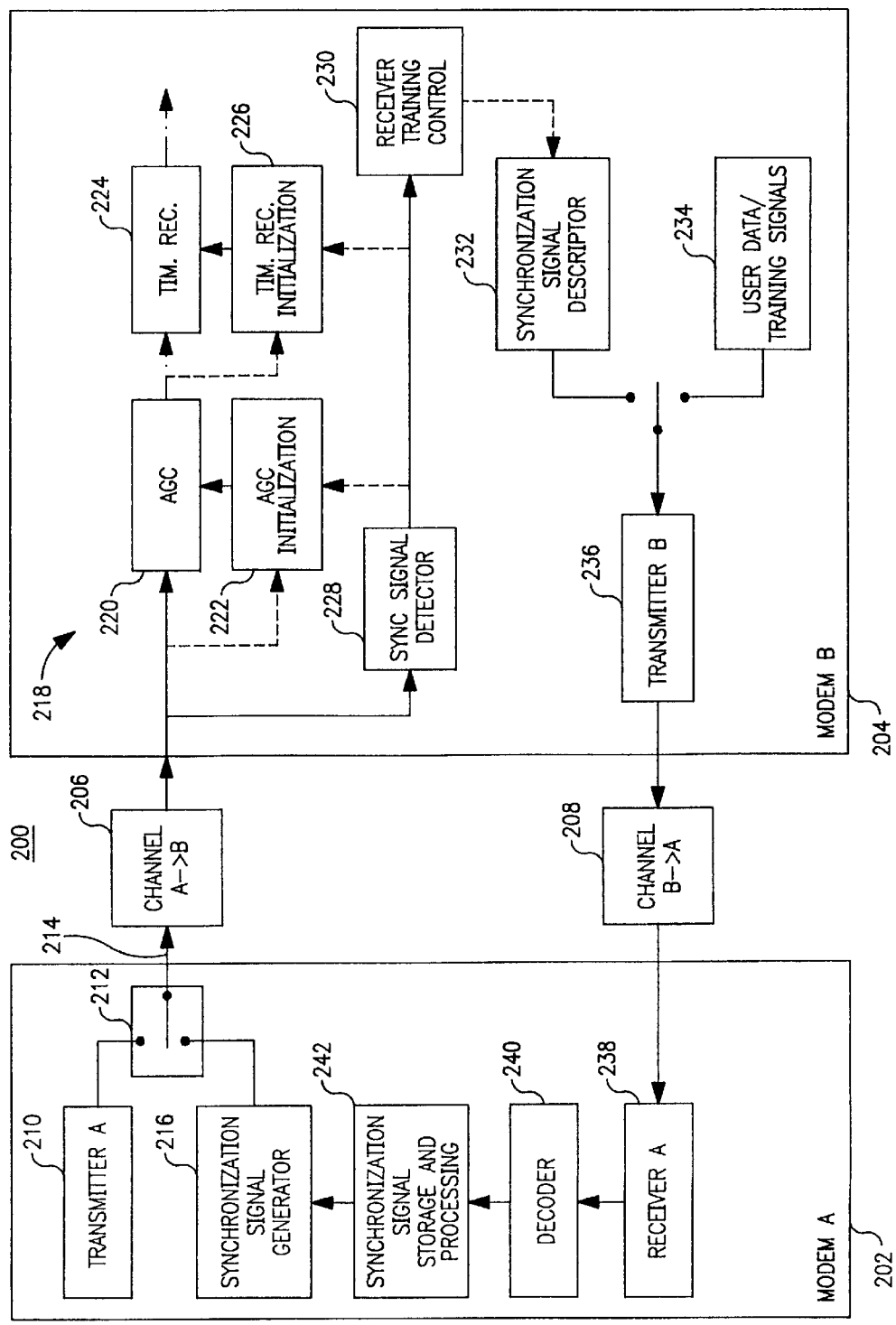
FIG. 2 is a block diagram of an exemplary modem system in which the present invention may be incorporated.

FIG. 2 is a block diagram of a preferred exemplary modem system 200 that incorporates the synchronization features of the present invention; it will be appreciated, however, that the present invention can be implemented in the context of any number of different synchronization, timing recovery, and other signal processing techniques known in the art. For example, many suitable techniques are described in Lee & Messerschmitt, DIGITAL COMMUNICATION (2d ed. 1996), which is incorporated herein by reference. Accordingly, the particular implementations shown and described herein are merely exemplary and are not intended to limit the scope of the present invention in any way. Indeed, for the sake of brevity, the particular timing recovery, automatic gain control (AGC), synchronization, training techniques, and other functional aspects of the system shown in FIG. 2 need not be described in detail herein.

Generally, modem system 200 includes a first modem, e.g., modem 202, and a second modem, e.g., modem 204. Modems 202, 204 are generally configured in accordance with known principles to communicate over at least two channels, e.g., channels 206, 208. It should be appreciated that, although not shown in FIG. 2, modem system 200 may include a number of additional hardware and software components. In addition, the various individual elements of modem system 200 may be realized by any number of discrete semiconductor chips, memory elements, and/or processing elements, and that the various processes described herein may be controlled by software instructions carried out by a suitable microprocessor.

Modem 202 includes a transmitter 210, which is configured to transmit encoded data symbols in accordance with general PCM techniques. Transmitter 210 may cooperate with a polarity/amplitude block 212 to produce an output 214 that contains synchronization-conveying data symbols. Polarity/amplitude block 212 functions to configure encoded data symbols in accordance with a synchronization signal format associated with modem 204 (described in more detail below). Polarity/amplitude block 212 may suitably include a polarity assigner that assigns a positive or a negative polarity to data symbols. The polarity assigner may employ digital techniques such that, for example, a "0" bit received from a synchronization signal generator 216 results in a positive output symbol and a "1" bit received from synchronization signal generator 216 results in a negative output symbol. Of course, any suitable digital or analog control scheme may be employed by synchronization signal generator 216 or the polarity assigner. A polarity assigner may be an effective functional component in modem systems that employ fixed or predetermined transmit amplitudes. For example, many modem systems utilize two specific levels (positive and negative) for purposes of synchronization and receiver training. Accordingly, a synchronization signal that assumes the two transmit amplitudes may be defined in part by a simple sign pattern.

In addition to, or in lieu of, the polarity assigner, polarity/amplitude block 212 may include a suitable amplitude assigner that assigns a particular amplitude to the current data symbol. Such an amplitude assigner may be desirable to enable modem system 200 to employ variable transmit levels during training or synchronization intervals or to enable modem 204 to request that particular transmit levels be used during training or synchronization processes. As with the polarity assigner described above, the amplitude assigner may utilize any number of techniques to produce a suitable signal output. For example, amplitude assigner may define a particular $\mu$-law code for each amplitude level;

transmission of the two μ-law codes may thereafter be switched according to a specific amplitude pattern (which may be controlled or generated by synchronization signal generator 216). For example, a "0" bit received by the amplitude assigner may cause the current data symbol to be transmitted at a first μ-law level, while a "1" bit received by the amplitude assigner may cause the current data symbol to be transmitted at a second μ-law level different than the first μ-law level. Of course, the specific amplitudes may vary according to the given application, and different polarities may be assigned to the particular codes.

It should be appreciated that modem system 200 may employ alternate techniques for producing the synchronization signal. For example, rather than utilize polarity/amplitude assigner 212 as described above, modem 202 may include a switch that controls whether the output from transmitter 210 or the output from synchronization signal generator 216 is transmitted to modem 204. Such a configuration may be desirable in a modem system that utilizes a coding scheme that does not lend itself to the generation of synchronization-conveying data symbols. In such a system, the switch may cause a devoted synchronization signal generated by synchronization signal generator 216 to be transmitted to modem 204 during a synchronization or resynchronization procedure. Conversely, during periods of data transmission, the switch is preferably set such that the output from transmitter 210 is directed over channel 206. Those skilled in the art will appreciate that the present invention is not limited to any specific synchronization signal transmission technique and that alternate techniques may be employed to accomplish equivalent results.

Although not a requirement of the present invention, output signal 214 preferably conveys the encoded information bits in data symbols that are arranged such that they concurrently convey synchronization or timing information to modem 204. Accordingly, the combination of, inter alia, transmitter 210, polarity/amplitude block 212, and synchronization signal generator 216 may be functionally equivalent to a "transmitter" that transmits a synchronization signal from modem 202 to modem 204. Synchronization-conveying data symbols may be transmitted during an initialization or synchronization procedure or periodically during a resynchronization period performed during a given data transmission session. It should be appreciated that the techniques described herein may be equivalently applied to a system that utilizes a synchronization signal that is transmitted independently from the data symbols.

With continued reference to FIG. 2, output signal 214 is suitably transmitted over channel 206 to modem 204 in accordance with conventional techniques. Modem 204 includes a receiver 218 configured to receive signals transmitted by modem 202; modem 204 processes such signals to obtain the original digital data encoded by modem 202. It should be noted that receiver 218 may include any number of additional components (that may be known in the art) for decoding, equalization, conditioning, or other processing of the received signal. Receiver 218 preferably includes an AGC circuit 220, which may include an AGC initialization circuit 222, and a timing recovery circuit 224, which may include a timing recovery initialization circuit 226. Circuits 220, 222, 224, and 226 may be configured in accordance with any number of known techniques and may employ a variety of suitable signal processing techniques. For purposes of the present invention, timing recovery circuit 224 may be configured such that a number of processing parameters are dependent upon the transmit rate of symbols received from modem 202. It should be noted that the present invention may be applicable to other adaptive processing schemes utilized by receiver 218 or any "trainable" components employed by modem 204.

Modem 204 preferably includes a synchronization signal detector 228 which communicates with AGC initialization circuit 222 and with timing recovery initialization circuit 226. Synchronization signal detector 228 is configured to detect the presence of the synchronization signal within the synchronization-conveying data symbols transmitted by modem 202. Synchronization signal detector 228 may employ any suitable sign (polarity), amplitude, and/or other convenient detection schemes, such as conventional filtering or conditioning techniques. In the exemplary embodiment shown in FIG. 2, the detection of the synchronization signal may cause AGC initialization circuit 222 or timing recovery initialization circuit 226 to respectively initialize AGC circuit 220 or timing recovery circuit 224. Synchronization signal detector 228 (or other processing elements of modem 204) may also be configured to obtain synchronization or timing information used by AGC initialization circuit 222 or timing recovery initialization circuit 226.

Synchronization signal detector 228 may also be configured to process the synchronization signal to obtain timing or synchronization information therefrom, e.g., one or more timing markers. It should be appreciated that circuits 220, 222, 224, and 226 need not directly receive or process the actual synchronization signal or the data symbols conveying the synchronization signal; rather, circuits 220, 222, 224, and 226 may utilize timing markers obtained from the synchronization signal for use during initialization and training. Accordingly, a receiver training control block 230 may be utilized to initiate and regulate training or resynchronization processes within modem 204 or to control parameters associated with a synchronization signal format compatible with receiver 218.

Modem 204 is preferably capable of requesting a particular synchronization signal format with which it is compatible. As discussed briefly above, receiver 218 may be designed such that trainable components, e.g., AGC circuit 220 or timing recovery circuit 224, are optimally initialized with a synchronization signal having a particular format. For purposes of this description, "synchronization signal format" means any characteristic of the synchronization signal that may affect the nature or quality of the training performed by modem 204. For example, the synchronization signal format may include, inter alia, one or more of the following parameters: a number of amplitude levels used for the synchronization signal; an amplitude range for the synchronization signal symbols; a desired sign pattern associated with symbols or data transmitted in accordance with the synchronization signal; a desired amplitude pattern associated with symbols or data transmitted in accordance with the synchronization signal; a preferred spectral content for the synchronization signal; a period or length of the synchronization signal; a repetition factor associated with periodic synchronization signals; and whether (and to what extent) inverse synchronization signals are employed.

In a preferred exemplary embodiment, a synchronization signal descriptor stored at modem 204 contains a synchronization signal format compatible with receiver 218. Moreover, modem 204 may include any number of suitable synchronization signal descriptors for use in any number of specific operating conditions and that the present invention is not limited to any given synchronization signal format, whether or not described in detail herein. Modem 204 may incorporate a memory element 232 that stores at least one synchronization signal descriptor associated with receiver 218. In other words, the synchronization signal descriptor may be dependent upon particular design parameters of receiver 218, e.g., the scheme employed by timing recovery circuit 224 or the scheme employed by AGC circuit 220. For example, the particular timing recovery scheme may be best initialized with a simple and easy-to-detect synchronization signal, such as a short tone. Alternately, the specific timing recovery scheme may be designed such that a spectrally rich and relatively complex synchronization signal produces the best results during training. Furthermore, different AGC strategies may suggest different synchronization signal formats. It should be noted that the synchronization signals need not be utilized directly by the associated circuits and processing schemes used by receiver 218.

The specific synchronization signal descriptor may be realized in any suitable form capable of transmission from modem 204 to modem 202. For example, the descriptor may be formatted as digital information and transmitted in accordance with known signaling or training protocols. Such information is thus indicative of the synchronization signal descriptor. Modem 204 may incorporate transmission of such information with the transmission of conventional user data and training signals (indicated by reference number 234). Accordingly, a transmitter 236 is preferably configured to transmit the descriptor information to modem 202. Modem 204 may cause transmitter 236 to transmit the synchronization signal descriptor information automatically during an early portion of a start-up sequence, in response to any number of conventional signaling packets transmitted during an initialization procedure, or in response to a synchronization request transmitted by modem 202. As with other conventional training or signaling data, such a request may be included in the initial training sequence, e.g., at the beginning of a conventional handshaking procedure.

The information containing the synchronization signal descriptor is preferably transmitted through channel 208 in a conventional manner and eventually received by a receiver 238 located at modem 202. Of course, modem 202 may employ any suitable alternative device or technique for receiving the synchronization signal format from modem 204. A decoder 240 may be used to decode any signals transmitted by modem 204 to modem 202, including the signal that conveys the synchronization signal descriptor.

Modem 202 may also include a synchronization signal storage/processing block 242 that communicates with synchronization signal generator 216. Synchronization signal storage/processing block 242 is preferably configured to process the synchronization signal descriptor and to provide suitable data to synchronization signal generator 216 such that an appropriate synchronization signal is formatted. As described more fully below, synchronization signal storage/processing block 242 may be capable of storing any number of synchronization signal format parameters that are known by both modem 202 and modem 204. Use of such predetermined parameters may be desirable to reduce the amount of information necessary to define a given synchronization signal favored by modem 204.

Although the synchronization signal descriptor may contain any suitable formatting data, the preferred exemplary embodiment assumes that the initial training signal will use a two-level signal, i.e., two levels of equal amplitude but of opposing sign. The specific levels utilized may be predetermined or specified in the synchronization signal descriptor. Consequently, a unique synchronization signal may be specified by modem 204 by indicating a pattern of sign variations. Furthermore, if the synchronization signal pattern is assumed to include a number of periodic sub-patterns, then a unique signal can be specified with less information by indicating a period, the sign pattern within each period, and a number of repetitions of the period. Accordingly, a flexible manner of specifying a synchronization signal may use the following parameters:

P—the period of the sub-pattern;

SP—the sign pattern within the sub-pattern; and

N—the number of repetitions of the sub-pattern.

Although the type of synchronization signal typically does not affect the performance of transmitter 210, it may be desirable to shape the spectrum of the synchronization signal to avoid possible problems with transformer hybrids employed by modem system 200. For example, it may be preferable to restrict the possible synchronization signal sign patterns to those with little or no DC content, e.g., sign patterns having an equal number of positive and negative symbols. In addition, a given sub-pattern may be formed from a series of similar sequences, thus giving rise to less spectral content than a sub-pattern formed from a single, non-repeating sequence. Those skilled in the art should appreciate that the ranges of P and N may be suitably selected in accordance with the particular data communication environment or specific functional components within the operating environment. In one preferred exemplary embodiment, the value of P is within the range of 16 to 32 and the value of N is within the range of 8 to 16.

To enable the communication of symbol position information, the synchronization signal can be augmented with an inverse synchronization signal corresponding to at least a portion of the synchronization signal or associated with the particular sub-pattern. Such an inverse signal may follow one or more repetitions of the synchronization signal (which may be related to any number of sign sub-patterns). For example, N periods of the sub-pattern may be repeated, followed by P symbols transmitted with the opposite signs of that specified in SP. In accordance with this technique, the symbol position appears as a phase reversal of the synchronization pattern. The descriptor contents for two exemplary synchronization signals are set forth below.

EXAMPLE 1

Four (4) symbol sub-sub-pattern, equivalent to a 2 kHz tone; 128 total symbols followed by 16 symbols of inverse polarity:

P=16

SP=0110 0110 0110 0110

N=8

EXAMPLE 2

Twenty-four (24) symbol pattern, rich spectral content; 240 total symbols followed by 24 symbols of inverse polarity:

P=24

SP=0000 1000 0101 1110 1010 1111

N=10

As described briefly above, modem system 200 may be alternately configured such that an amplitude pattern is used in addition to (or instead of) a sign pattern. Furthermore, the synchronization signal descriptor may specify the particular amplitude levels with which modem 202 should transmit the synchronization-conveying and other data symbols. Thus, in addition to conveying a sign pattern, the synchronization signal descriptor may convey an amplitude pattern. Those skilled in the art will recognize that sign patterns and amplitude patterns may both be realized as a sequence of digital bits within the synchronization signal descriptor; synchronization signal storage/processing block 242 and synchronization signal generator 216 may simply interpret and process the sequence in a different manner. Synchronization signal detector 228 is suitably configured to receive and detect any polarity (and/or amplitude) changes in the stream of received symbols and to convey the timing data to AGC initialization circuit 222 or timing recovery circuit 226. As described briefly above, synchronization signal detector 228 may be realized with any number of known processing components, e.g., bandpass (or other) filters or correlation detectors.

To decrease the amount of information needed to specify a synchronization signal, one or more of the above parameters (including an amplitude pattern) can be fixed at both modem 202 and modem 204. For example, the parameter P could be fixed to any suitable number, e.g., 12, which allows for sub-patterns of periods 2, 3, 4, 6, or 12. Consequently, only the 12-symbol sign pattern SP and the number of repetitions N would need to be transmitted by modem 204. Of course, the parameter N could also be predetermined, e.g., N=16, which would call for a length of 192 symbols. It should be appreciated that, although possible to fix the sign pattern SP, the benefits of the present invention are best realized when the sign pattern optimized for receiver 218 is initially unknown to modem 202.

Figure 3:
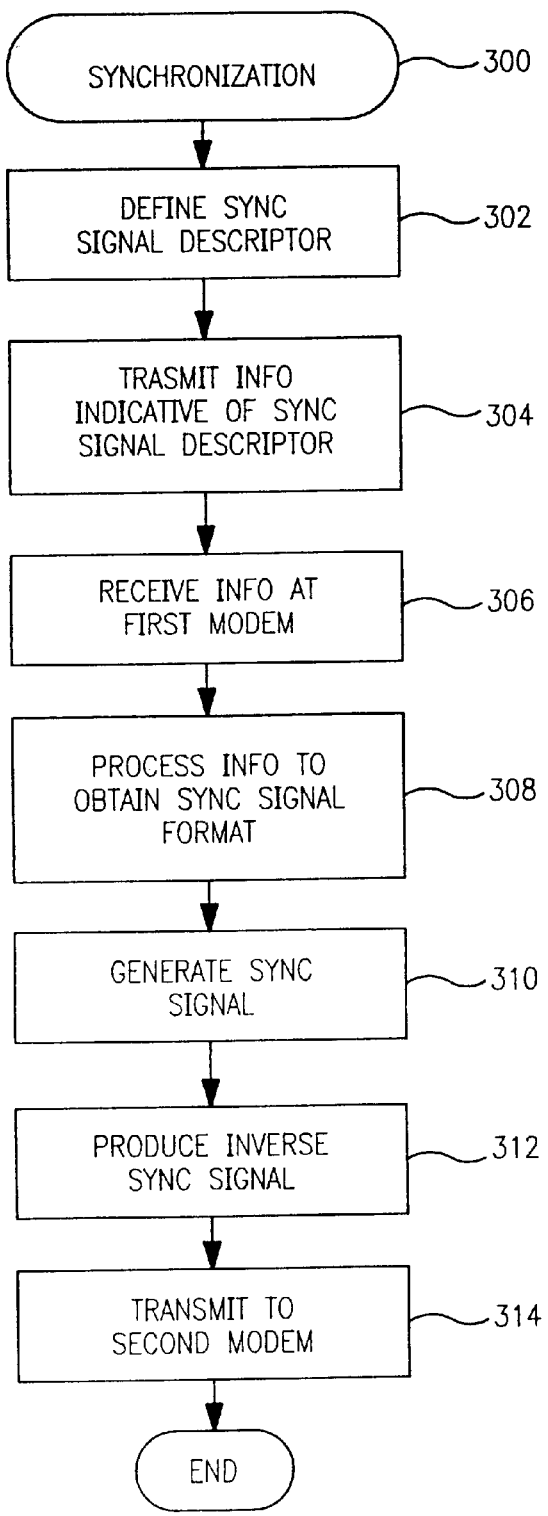
FIG. 3 is a flow diagram of a synchronization process that may be carried out by the modem system shown in FIG. 1.

Referring now to FIG. 3, an exemplary synchronization process 300 may be performed by modem system 200. It should be noted that the majority of synchronization process 300 may be performed during a training procedure associated with modem system 200 or during a periodic resynchronization procedure performed during an established transmission session between modems 202, 204. Process 300 may be performed in conjunction with any number of conventional data communication processes, and additional or alternative processing techniques may be suitably employed in a practical implementation. Furthermore, process 300 may be controlled by software instructions carried out by any number of microprocessors employed by modem system 200. The function of such processing and control systems are known to those skilled in the art and, therefore, are not described in detail herein.

Synchronization process 300 preferably begins with a task 302, which defines at least one synchronization signal descriptor (described above) associated with receiver 218 (see FIG. 2). Task 302 may be carried out automatically by modem 204 or in response to a remote programming routine configured to load the appropriate information into memory element 232. Alternatively, task 302 may be performed by memory element 232 and a corresponding processor element (not shown) of modem 204; in practice, the synchronization signal descriptor may be defined by digital data stored in memory element 232. Task 302 preferably defines at least one of: (1) a sign pattern (and/or an amplitude pattern) associated with a synchronization signal transmitted by modem 202; (2) a period associated with the synchronization signal; and (3) a number of repetitions of the synchronization signal to be transmitted by modem 202. These parameters are all described in detail above.

Following task 302, a task 304 causes modem 204 to transmit information indicative of a particular synchronization signal descriptor to modem 202. As described above, task 304 may be performed by transmitter 236. Eventually, a task 306 is performed to receive the transmitted information at modem 202. Receiver 238 may be utilized to accomplish task 306. Following task 306, a task 308 may be performed to process the received information and to extract the synchronization signal descriptor therefrom. Task 308 may employ any number of conventional signal processing techniques known to those skilled in the art.

After a sufficient amount of the synchronization signal descriptor is obtained at modem 202, a task 310 is performed to suitably generate a synchronization signal for transmission to modem 204. As described above, the synchronization signal is preferably configured in accordance with the synchronization signal descriptor. The synchronization signal may be generated by synchronization signal generator 216 and polarity/amplitude block 212.

In addition to task 310, a task 312 may be performed to produce an inverse synchronization signal corresponding to at least a portion of the synchronization signal. As described above, the inverse synchronization signal may be generated by reversing the polarity of the received sign pattern (or, alternatively, by reversing the amplitude assignment set forth in the received amplitude pattern). Following task 312, a specific synchronization signal, which is especially compatible with modem 204, is known at modem 202. This synchronization signal preferably includes a number of repetitions of a particular sign or amplitude sub-pattern followed by at least one iteration of an inverse to the sub-pattern.

A task 314 is performed to transmit the desired synchronization signal from modem 202 to modem 204, where it is received, processed, and utilized by modem 204 to obtain timing markers used by various components of receiver 218. Although this description refers to the transmission and processing of a synchronization signal, it should be appreciated that a practical implementation of the present invention utilizes the synchronization signal to format data symbols such that synchronization or timing information may be "embedded" within synchronization-conveying symbols contained in output 214. Following task 314, synchronization process 300 ends.

In summary, the present invention provides an improved synchronization technique that is suitable for use with remote data communication systems. Such a data communication system can be suitably provided with a programmable synchronization signal that is formatted in accordance with the design of a receiver used in the system. The system also uses a transmitter configured to generate the particular synchronization signal, which may be associated with a timing recovery scheme utilized by the receiver. In addition, the present invention provides a receiver modem capable of requesting transmission of a specifically formatted synchronization signal for use during a training process.

The present invention has been described above with reference to a preferred embodiment. However, it will be appreciated that changes and modifications may be made to the preferred embodiment without departing from the scope of the present invention. For example, the specific format and parameters used to define the synchronization signal descriptor may vary from application to application. In addition, the present invention may be suitably adapted for use in any number of different hardware environments. These and other changes or modifications are intended to be included within the scope of the present invention, as expressed in the following claims.

What is claimed is:

1. A synchronization method for use in a data communication system having a first device configured to transmit data at a symbol rate to a second device, said method comprising the steps of:

defining a synchronization signal descriptor at said second device associated with a receiver of said second device;

sending information indicative of said synchronization signal descriptor from said second device to said first device;

receiving said information at said first device; and generating at said first device a synchronization signal for transmission from said first device to said receiver, said synchronization signal being configured in accordance with said synchronization signal descriptor.

2. A synchronization method according to claim 1, wherein said receiving step and said generating step are performed during a training procedure associated with said data communication system.

3. A synchronization method according to claim 1, wherein said defining step defines a sign pattern associated with symbols to be transmitted by said first device.

4. A synchronization method according to claim 3, wherein said sign pattern comprises a first number of bits indicating positive polarity and a second number of bits indicating negative polarity.

5. A synchronization method according to claim 1, wherein said defining step defines an amplitude pattern associated with symbols to be transmitted by said first device.

6. A synchronization method according to claim 1, wherein said defining step defines a period associated with said synchronization signal.

7. A synchronization method according to claim 1, wherein said defining step defines a number of repetitions of said synchronization signal to be transmitted from said first device to said receiver.

8. A synchronization method according to claim 1, wherein said defining step comprises defining said synchronization signal descriptor such that said synchronization signal descriptor is associated with a timing recovery scheme utilized by said receiver.

9. A synchronization method according to claim 1, wherein said defining step comprises defining said synchronization signal descriptor such that said synchronization signal descriptor is associated with an automatic gain control (AGC) scheme utilized by said receiver.

10. A synchronization method according to claim 1, wherein said generating step comprises generating said synchronization signal such that the spectral content of said synchronization signal is associated with a timing recovery scheme utilized by said receiver.

11. A synchronization method according to claim 1, wherein said generating step comprises generating said synchronization signal such that the spectral content of said synchronization signal is substantially free of DC.

12. A synchronization method according to claim 1, further comprising the steps of:

producing an inverse synchronization signal corresponding to at least a portion of said synchronization signal; and transmitting said inverse synchronization signal from said first device to said receiver to thereby provide symbol position information to said receiver, said transmitting step being performed after transmission of said synchronization signal from said first device to said receiver.

13. A synchronization system for use in a data communication system having a first device configured to transmit data at a symbol rate, and a second device configured to receive data transmitted from said first device, said synchronization system comprising:

means for storing a synchronization signal descriptor having a synchronization format associated with a receiver of said second device, said means for storing being located at said second device;

means for sending information indicative of said synchronization signal descriptor from said second device to said first device;

means for receiving said information at said first device;

means for generating a synchronization signal at said first device, said synchronization signal being configured in accordance with said synchronization signal descriptor; and means for transmitting said synchronization signal from said first device to said second device.

14. A synchronization system according to claim 13, wherein said synchronization signal descriptor includes a sign pattern associated with symbols to be transmitted by said first device.

15. A synchronization system according to claim 14, wherein said sign pattern comprises a number of repeated sub-patterns.

16. A synchronization system according to claim 13, wherein said synchronization signal descriptor includes a period associated with said synchronization signal.

17. A synchronization system according to claim 13, wherein said synchronization signal descriptor includes a number of repetitions of said synchronization signal to be transmitted by said means for transmitting.

18. A synchronization system according to claim 13, wherein;

said receiver utilizes a timing recovery scheme; and said synchronization signal descriptor is associated with said timing recovery scheme.

19. A synchronization system according to claim 18, wherein the spectral content of said synchronization signal is associated with said timing recovery scheme.

20. A synchronization system according to claim 13, wherein:

said receiver utilizes an automatic gain control (AGC) scheme; and said synchronization signal descriptor is associated with said AGC scheme.

21. A synchronization system according to claim 13, wherein:

said means for generating is further configured to produce an inverse synchronization signal corresponding to at least a portion of said synchronization signal; and said means for transmitting is further configured to transmit said inverse synchronization signal after transmitting said synchronization signal to thereby provide symbol position information to said receiver.

22. A synchronization system according to claim 13, wherein said synchronization signal descriptor includes an amplitude pattern associated with symbols to be transmitted by said first device.

23. A synchronization system according to claim 13, wherein said synchronization signal is utilized by said second device as a timing marker.

24. In a data communication system having a first device configured to transmit data at a symbol rate to a second device, a method for providing a synchronization signal to said second device, said method comprising the steps of:

receiving, at said first device, information indicative of a synchronization signal descriptor having a synchronization format;

generating at said first device a synchronization signal in accordance with said information; and transmitting said synchronization signal from said first device to said second device.

25. A method according to claim 24, further comprising the step of repeating transmission of said synchronization signal in accordance with a number of repetitions, said number of repetitions being included in said synchronization signal descriptor.

26. A method according to claim 24, wherein said synchronization signal descriptor includes at least one of a sign pattern associated with symbols to be transmitted by said first device, an amplitude pattern associated with symbols to be transmitted by said first device, a period associated with said synchronization signal, and a number of repetitions of said synchronization signal to be transmitted from said first device to said second device.

27. A method according to claim 26, wherein said sign pattern includes substantially the same number of positive and negative indicators.

28. A method according to claim 26, wherein at least one of said sign pattern, said amplitude pattern, said period, and said number of repetitions is predetermined and known at said first device prior to said receiving step.

29. A method according to claim 24, wherein said synchronization signal descriptor is associated with a timing recovery scheme utilized by a receiver of said second device.

30. A method according to claim 24, wherein said synchronization signal descriptor is associated with an automatic gain control (AGC) scheme utilized by a receiver of said second device.

31. A method according to claim 24, further comprising the steps of:

producing an inverse synchronization signal corresponding to at least a portion of said synchronization signal; and transmitting said inverse synchronization signal from said first device to said second device to thereby provide symbol position information to said second device, said inverse synchronization signal being transmitted after transmission of said synchronization signal.

32. A receiver unit for use in a data communication system having a corresponding transmitter unit, said receiver unit comprising:

means for storing information associated with at least one synchronization signal format compatible with said receiver unit;

a transmitter for transmitting to said transmitter unit said information in response to a synchronization request from said transmitter unit received by said receiver unit; and a detection circuit for detecting a synchronization signal sent from the transmitter unit, said synchronization signal utilized by said receiver unit and being configured in accordance with said information.

33. A receiver unit according to claim 32, wherein said information is associated with design parameters of said receiver unit.

34. A receiver unit according to claim 33, wherein:

said receiver unit further comprises a timing recovery circuit for recovering a symbol rate associated with a signal received by said receiver unit; and said design parameters relate to said timing recovery circuit.

35. A receiver unit according to claim 32, wherein said information comprises a synchronization signal descriptor.

36. A receiver unit according to claim 35, wherein said synchronization signal descriptor includes at least one of a sign pattern associated with symbols to be received by said receiver unit, an amplitude pattern associated with symbols to be received by said receiver unit, a period associated with said synchronization signal, and a number of repetitions of said synchronization signal to be received by said receiver unit.

37. A receiver unit according to claim 32, further comprising means for processing said synchronization signal to obtain at least one timing marker therefrom.

38. A transmitter unit for use in a data communication system having a corresponding receiver unit, said transmitter unit comprising:

a receiver for receiving information sent from the receiver unit, said information associated with a synchronization signal format compatible with said receiver unit;

means for processing said information to retrieve said synchronization signal format;

means for configuring data symbols in accordance with said synchronization signal format to thereby produce synchronization-conveying data symbols; and a transmitter for transmitting said synchronization-conveying data symbols to said receiver unit.

39. A transmitter unit according to claim 38, wherein said means for configuring data symbols comprises a polarity assigner configured to assign a polarity to said data symbols in accordance with said synchronization signal format.

40. A transmitter unit according to claim 38, wherein said information is associated with design parameters of said receiver unit.

41. A transmitter unit according to claim 40, wherein said design parameters relate to a timing recovery circuit utilized by said receiver unit.

42. A transmitter unit according to claim 38, wherein said information comprises a synchronization signal descriptor.

43. A transmitter unit according to claim 42, wherein said synchronization signal descriptor includes at least one of a sign pattern associated with said synchronization-conveying data symbols, an amplitude pattern associated with said synchronization-conveying data symbols, and a period associated with said sign pattern.

44. A transmitter unit according to claim 38, wherein said means for configuring data symbols comprises an amplitude assigner configured to assign an amplitude to said data symbols in accordance with said synchronization signal format.

* * * * *

UNITED STATES PATENT AND TRADEMARK OFFICE
CERTIFICATE OF CORRECTION

PATENT NO.   : 6,212,247 B1
DATED        : April 3, 2001
INVENTOR(S)  : Sverrir Olafsson It is certified that error appears in the above-identified patent and that said Letters Patent is hereby corrected as shown below:

<u>Title page,</u>
Under Inventors, please change "Reykjavik Ireland" to -- Reykjavik Iceland --.

Signed and Sealed this

Second Day of October, 2001

Attest:

NICHOLAS P. GODICI
Attesting Officer — Acting Director of the United States Patent and Trademark Office